US010225982B2

(12) United States Patent
Missotten et al.

(10) Patent No.: US 10,225,982 B2
(45) Date of Patent: Mar. 12, 2019

(54) STALKED CROP HARVESTING HEADER FRAME (71) Applicant: CNH Industrial America LLC, New Holland, PA (US)

(72) Inventors: Bart M.A. Missotten, Herent (BE); Tom De Smet, Maldegem (BE); Frederik Tallir, Esen (BE); Willem Vandamme, Ichtegem (BE); Geert Bonne, Damme (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/248,887

(22) Filed: Aug. 26, 2016

(65) Prior Publication Data
US 2017/0055447 A1    Mar. 2, 2017

(30) Foreign Application Priority Data

Aug. 31, 2015 (BE) .................................. 2015/5551

(51) Int. Cl.
*A01D 45/02* (2006.01)
*A01D 57/06* (2006.01)
(52) U.S. Cl.
CPC ......... *A01D 45/023* (2013.01); *A01D 45/021* (2013.01); *A01D 45/025* (2013.01); *A01D 57/06* (2013.01)
(58) Field of Classification Search
CPC .... A01D 45/02; A01D 45/021; A01D 45/023; A01D 45/025; A01D 57/06;
(Continued)

(56) References Cited

U.S. PATENT DOCUMENTS 1,964,579 A * 6/1934 Hyman ................ A01D 45/021
56/119
2,169,070 A * 8/1939 Kuhlman ............. A01D 45/025
460/27
(Continued)

FOREIGN PATENT DOCUMENTS

DE  102011118207 A1 *  5/2013  ........... A01D 45/021
DE  102011118207 A1     5/2013
(Continued)

OTHER PUBLICATIONS

EP16186715.5, Extended European Search Report, dated Jan. 16, 2017, 5 pages.

*Primary Examiner* — Alicia Torres
*Assistant Examiner* — Adam J Behrens
(74) *Attorney, Agent, or Firm* — Peter K. Zacharias; Patrick M. Sheldrake (57) ABSTRACT A stalked crop harvesting header include multiple harvesting units each including a set of deck plates defining a channel, a set of snapping rollers mounted below the deck plates and adapted to grasp and pull stalks downwardly through the channel, and a pair of gathering chains adapted for conveying stalks along the channel. Each harvesting unit further includes a stalk guider at either side of a front end of the channel. Each stalk guider includes an upper stalk guiding wheel and a lower stalk guiding wheel carried by a frame. The frame includes a protrusion between the upper and the lower stalk guiding wheels, which protrusion includes a support for carrying a respective front end of the snapping rollers.

22 Claims, 6 Drawing Sheets (58) Field of Classification Search
CPC .. A01D 43/081; A01D 43/082; A01D 43/083; A01D 47/00
See application file for complete search history.

(56) References Cited

U.S. PATENT DOCUMENTS

| | | | | |
|---|---|---|---|---|
| 2,180,594 A * | 11/1939 | Kuhlman | ............ | A01D 45/025 241/DIG. 30 |
| 4,009,557 A * | 3/1977 | Reicks | ................ | A01D 45/021 56/14.3 |
| 4,084,396 A * | 4/1978 | Fritz | .................... | A01D 43/082 56/157 |
| 4,143,504 A * | 3/1979 | Noack | ................ | A01D 45/023 56/111 |
| 4,219,990 A * | 9/1980 | Hill | ...................... | A01D 45/025 56/104 |
| 5,329,753 A * | 7/1994 | Arnold | ................ | A01D 41/144 56/119 |
| 5,878,561 A * | 3/1999 | Gunn | ................... | A01D 45/023 56/119 |
| 5,934,054 A * | 8/1999 | Landeis | ................. | A01D 57/22 171/DIG. 1 |
| 6,119,443 A | 9/2000 | Rauch | | |
| 6,212,864 B1 * | 4/2001 | Harden | ................. | A01D 46/14 56/35 |
| 7,874,134 B1 * | 1/2011 | Hoffman | .............. | A01D 45/023 56/119 |
| 8,286,410 B2 | 10/2012 | Priepke et al. | | |
| 9,295,196 B2 | 3/2016 | Surmann et al. | | |
| 9,414,542 B2 * | 8/2016 | Madheswaran | ........ | A01D 57/22 |
| 2011/0011048 A1 * | 1/2011 | Hoffman | .............. | A01D 45/023 56/119 |
| 2011/0308220 A1 | 12/2011 | Priepke et al. | | |
| 2014/0059994 A1 | 3/2014 | Surmann et al. | | |

FOREIGN PATENT DOCUMENTS

| | | | | |
|---|---|---|---|---|
| DE | 202011110622 U1 * | 4/2015 | ........... | A01D 45/021 |
| DE | 102014104304 A1 * | 10/2015 | ........... | A01D 45/021 |
| FR | 2485871 A1 | 1/1982 | | |
| FR | 2549685 A1 * | 2/1985 | ............ | A01D 34/66 |

* cited by examiner

STALKED CROP HARVESTING HEADER FRAME

BACKGROUND OF THE INVENTION

The present invention relates to a stalked crop harvesting header for an agricultural vehicle.

Stalked cropped harvesting headers are formed to pull stalks downward between a pair of deck plates that are spaced in such a manner that the stalk can substantially freely move through the channel formed by the deck plates while the corn head or other crop material heads are retained by the deck plates. Different aspects of such harvesting headers have been described. For example, WO 2012/152 866 describes the snapping rollers that are used to grasp and pull stalks downward through the channel. EP 2 412 228 describes a header wherein the spacing between the deck plates is adjustable to optimize the operation of the header. These documents describe headers that are row sensitive. Row sensitive headers are headers that operate correctly only when the channels of the multiple harvesting units in the header are aligned with the rows of stalked crop on the field. As a result of aligning the channel with the stalked crop, the stalked crop can enter the channel while the stalked crop is still rooted in the ground. In conventional row sensitive stalked crop harvesting headers, this ensures correct operation of the header.

A drawback of the known crop harvesting headers is that they only perform correctly when the rows of crop are aligned with the channels of the harvesting units. This places a burden on the driver of the agricultural vehicle because care should be taken that the vehicle is steered so that the channels are constantly aligned with the rows of stalked crop during the harvesting. Another drawback is that stalked crop can be sown in rows with different spacing. To be able to harvest rows with different spacings, different headers are required wherein the distance between the channels match the spacing between the rows of crop. To overcome these drawbacks of row sensitive harvesting, row non-sensitive harvesting headers have been proposed.

U.S. Pat. No. 6,119,443 describes a row non-sensitive harvesting header. A drawback of this header is that the mechanical structure is complex so that the header is expensive. Furthermore, because stalks are cut from the ground surface before entering the channel, the guiding of the stalks proves to be difficult resulting in the possibility of congestion of an entrance of the channel. In this context, tests have shown that stalks can experience a high resistance against entering the channel and entering the snapping rollers. Due to this resistance, the stalks choke the front end of the channels thereby ceasing the correct operation of the header.

US 2014/005 994 describes a row non-sensitive header wherein the stalks are caught at a higher level thereby preventing the stalks to fall down after being cut from the ground. This improves the movement of the stalks in between the snapping rollers and the channel, however it makes the header significantly more complex and expensive.

It is an object of the present invention to provide a row non-sensitive stalked crop harvesting header with a higher operational liability and an improved structure.

SUMMARY OF THE INVENTION

To this end, the invention provides a stalked crop harvesting header comprising multiple harvesting units, wherein each harvesting unit comprises a set of deck plates defining a channel, a set of snapping rollers mounted below the deck plates and adapted to grasp and pull stalks downwardly through the channel, a pair of gathering chains adapted for conveying stalks along the channel, wherein each harvesting unit further comprises a stalk guiding means at either side of a front end of said channel, wherein the stalk guiding means each comprise an upper stalk guiding wheel and a lower stalk guiding wheel both carried by a frame, wherein the frame further comprises a protrusion between the upper and the lower stalk guiding wheels, which protrusion comprises a support for carrying a respective front end of the snapping rollers.

The stalked crop harvesting header of the invention is row non-sensitive due to the cutting wheels which are provided below the stalk guiding wheels. These cutting elements cut stalks from the ground surface so that stalks that are not aligned with the channel can correctly be guided towards the channel via the guiding wheels. Furthermore, the guiding wheels can comprise multiple, for example two stalk guiding wheels. Particularly due to the frame provided at the front end, carrying both the upper and the lower stalk guiding wheels and being provided with a protrusion for carrying the front end of the snapping rollers allows a highly compact structure of the front end of the harvesting header. As a result of this compact structure, the operational liability is also improved because the relative position of stalk guiding wheels and snapping rollers are predetermined by the frame.

Preferably, the front ends of the snapping rollers are positioned between the respective upper stalk guiding wheel and lower stalk guiding wheel and within a periphery of at least one of the respective upper and lower stalk guiding wheel. This position further improves correct operation of the harvesting header. Tests have shown that the stalks can experience a significant resistance against entering in between the snapping rollers. In some configurations of the headers, this could result in clogging of stalks at the front end of the channel. However when the snapping rollers are arranged with a front end between and within a periphery of the guiding wheels, the stalks are forced by the guiding wheels in between the snapping rollers. Thereby, clogging is prevented and correct operation is ensured.

Preferably, the frame extends between the upper and lower stalk guiding wheel thereby covering a shaft interconnecting the upper and lower stalk guiding wheels. By covering the shaft interconnecting the upper and lower stalk guiding wheels, external elements such as dust particles and crop elements, cannot affect the correct operation of the guiding wheels.

Preferably, each harvesting unit further comprises a pair of stalk cutting wheels axially arranged with respective stalk guiding means. Thereby, the stalk cutting wheels are preferably mounted below the lower stalk guiding wheels. Via the stalk cutting wheels, stalk can be cut from a ground surface so that the stalks can be moved in the lateral direction towards the channel. Together with the stalk guiding means, this feature improves the row non-sensitive operation of the harvesting header.

Preferably, each stalk cutting wheel is interconnected via transmission means with the stalk guiding wheels so that the stalk guiding wheels are provided to be driven at a first rotational speed while the stalk cutting wheels are driven at a second rotational speed which is higher than the first rotational speed. Thereby, preferably, the frame covers the transmission means. Furthermore, preferably, the transmission means is formed as a planetary gearbox. By providing a planetary gearbox in the frame, a compact and reliable system is obtained for driving the stalk guiding wheels at a first speed and driving the stalk cutting wheels at a second speed without separate actuators or motors. A single motor or actuator can be provided to drive the guiding wheels and cutting wheels. This improves the structure as well as the operational liability of the harvesting header.

Preferably, the gathering chains extend between a first pair of gears located at either side of the front end of the channel and a second pair of gears located at a back end of the channel, wherein the first pair of gears is interconnected with a corresponding one of the pair of stalk guiding wheels. Thereby, preferably, each gear of the first pair of gears rotates around a respective shaft, and wherein the respective shafts are further connected to corresponding stalk guiding wheels so that the stalk guiding wheels and first pair of gears are interconnected via the respective shafts. By the interconnection of the first pair of gears and the stalk guiding wheels, the stalk guiding wheels can be driven via the gathering chain. The gathering chain is typically powered at a back end of the harvesting header. At the back end of the harvesting header, more space is available for mounting actuators or motors for driving the harvesting header components. The gathering chain is preferably driven at a back gear. The front gear rotates along with the back gear via the gathering chain extending between front and back gear. This rotation of the front gear is further transmitted to the guiding wheels. In this manner, no actuator or motor should be provided at the front end of the harvesting header, which improves the structure of the header.

Preferably, the stalk guiding wheels are disk-shaped and comprise indentations at a periphery of the disk. Preferably, the indentations are adapted to capture at least one stalk such that the stalk extends within the peripheral edges of the disk-shaped wheel. The disk-shape allows a simple structure of the harvesting unit, is easy to actuate and when provided with indentations, is able to guide stalks by catching the stalks in the guides thereby guiding stalks with high precision.

The invention further relates to an agricultural harvester carrying a stalked crop harvesting header according to the above-described invention. The invention further relates to a harvesting unit adapted for being part of a stalked crop harvesting header, wherein the harvesting unit comprises a set of deck plates defining a channel, a set of snapping rollers mounted below the deck plates and adapted to grasp and pull stalks downwardly through the channel, a pair of gathering chains adapted for conveying stalks along the channel, wherein each harvesting unit further comprises a stalk guiding means at either side of a front end of said channel, wherein the stalk guiding means each comprise an upper stalk guiding wheel and a lower stalk guiding wheel carried by a frame, wherein the frame further comprises a protrusion between the upper and the lower stalk guiding wheels, which protrusion comprises a support for carrying a respective front end of the snapping rollers. Multiple of these harvesting units built together form the harvesting header which is described above. The effects and advantages described above in relation to the harvesting header of the invention are a direct result of the technical features of the harvesting unit. Therefore these effects and advantages equally apply to the harvesting unit, as will be understood by the skilled person.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

Figure 1:
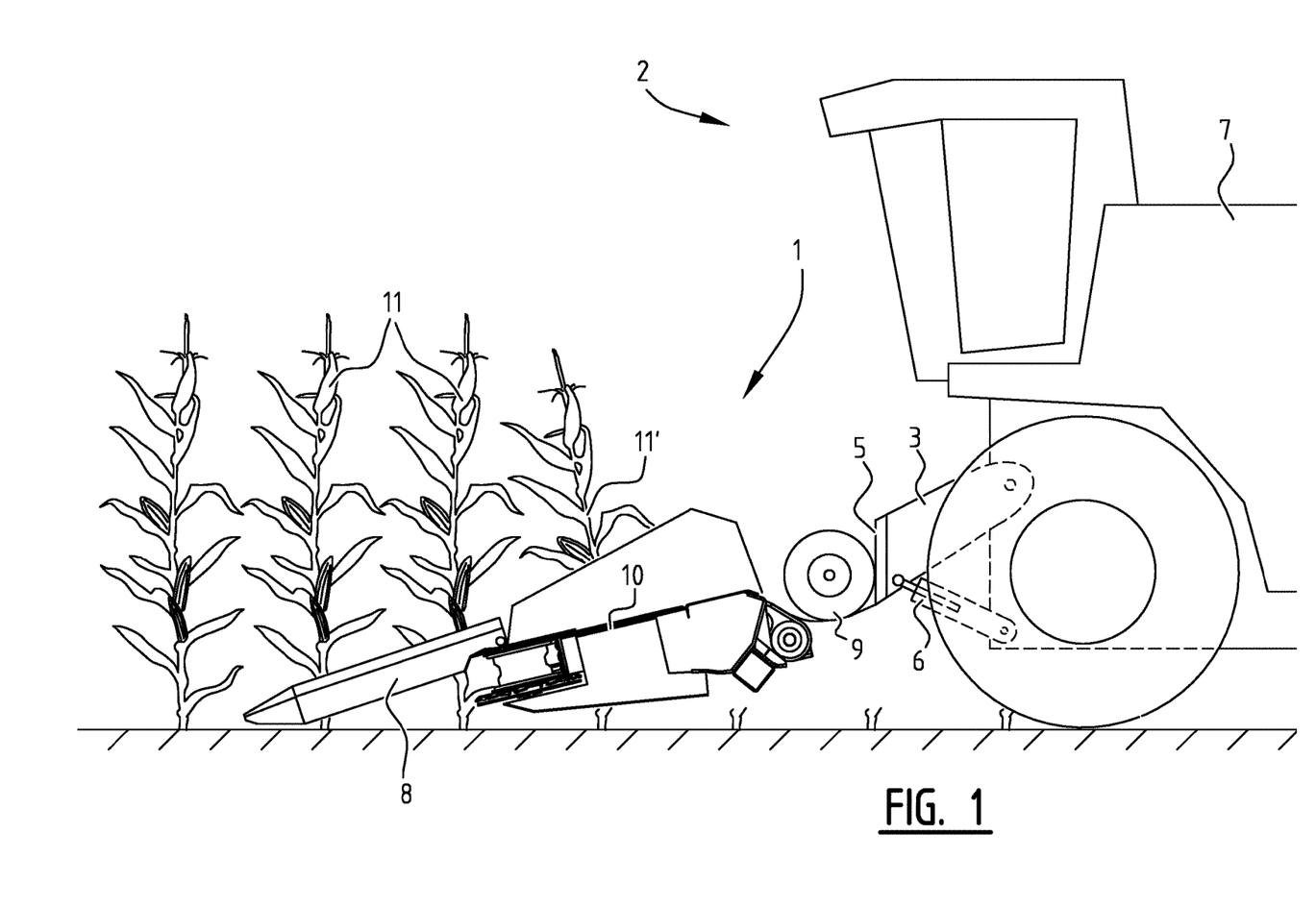
FIG. 1 illustrates a side view of an agricultural vehicle carrying a stalked crop harvesting header according to an embodiment of the invention.

FIG. 1 illustrates a stalked crop harvesting header 1 mounted to an agricultural vehicle 2, preferably an agricultural harvester. Thereby, the figure illustrates how the agricultural vehicle 2 is driven over a field with stalked crop 11. The header 1 is adapted to harvest the stalked crop 11, and to gather at least a part of the harvested crop, for example the crop elements, into the body 7 of the agricultural vehicle 2. The gathered crop elements can be further processed in the body 7 of the agricultural vehicle 2.

The header 1 is connected to the agricultural vehicle 2 via a feeder 3 and an actuator 6. The feeder 3 and the actuator 6 are connected to a header mounting plate 5, which header mounting plate 5 carries the header 1. Crop elements gathered by the header 1 are transported to the body 7 of the agricultural vehicle 2 via the feeder 3.

The header 1 comprises multiple lane determining elements 8. These lane determining elements 8 are formed as protrusions at a front end of the header 1 extending substantially in the forward driving direction of the vehicle 2. The lane determining elements are positioned between adjacent harvesting units 10 so that a respective lane is formed for each of the harvesting units 10. Thereby, the lane determining elements 8 function as a guide for the stalked crops on the field to guide each of the stalked crops into a lane and towards a harvesting unit 10. This is further shown and explained in relation to FIG. 2.

Once a stalked crop 11 is caught in the harvesting unit 10, the stalked crop is cut from the ground surface and is pulled downward, as is illustrated in FIG. 1 with crop element 11'. Preferably the stalk of the stalked crop is chopped while pulling the stalk downward. The crop elements, for example the corn crops, are torn away from the stalk during the pulling downward of the stalk. Thereby crop elements are at least partially separated from residue by the header. Crop elements are then gathered by screw conveyor 9. Screw conveyor 9 conveys the crop towards the feeder 3 so that the crop can be further processed in the body 7 of the agricultural harvester 2.

Figure 2:
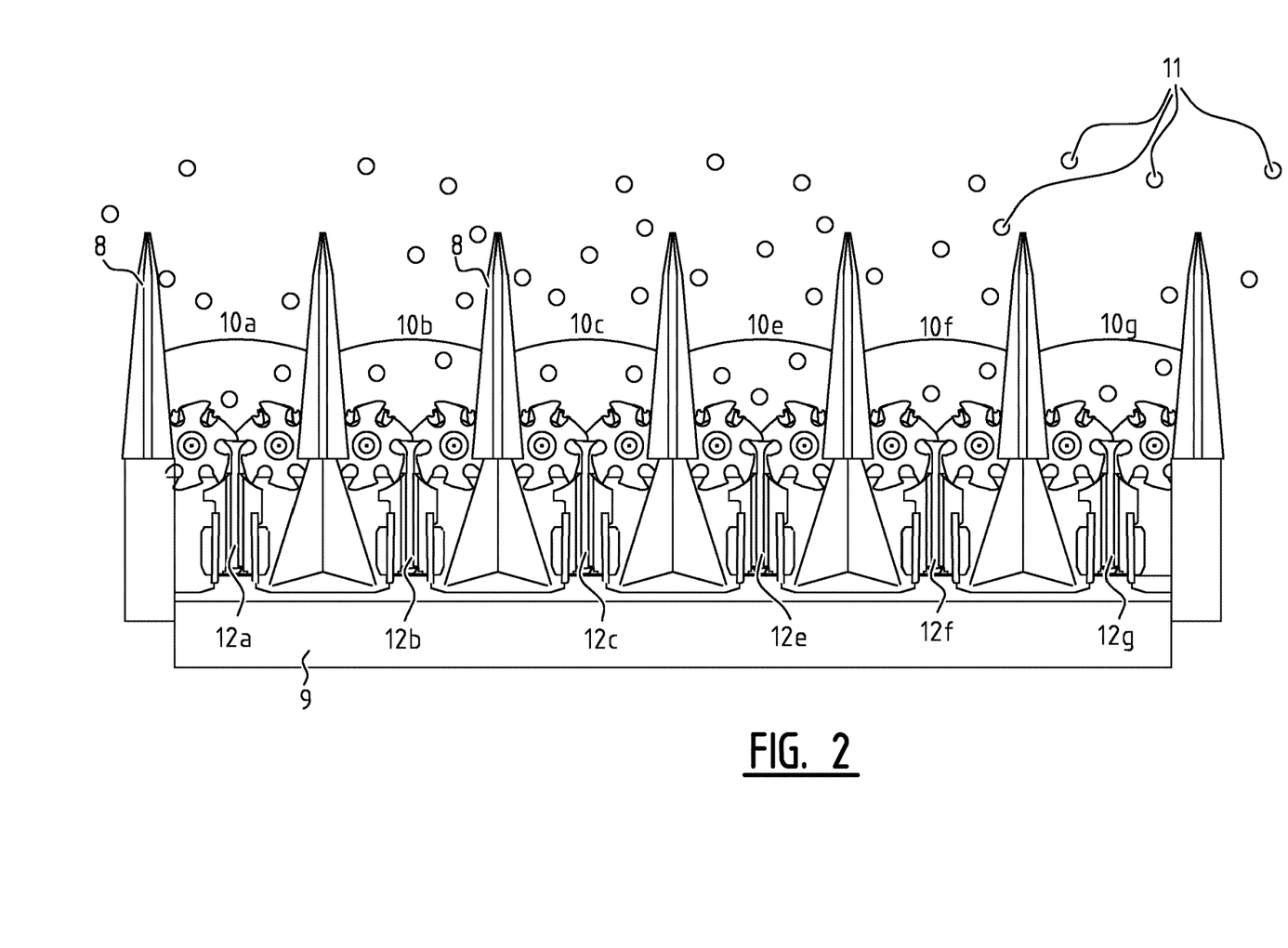
FIG. 2 illustrates a top view of the harvesting header of FIG. 1.

FIG. 2 shows a top view of the header 1 of FIG. 1. FIG. 2 shows how the header 1 extends over a significant width which is at least larger than the width of the agricultural harvester 2. The header 1 comprises multiple harvesting units (10a, 10b, . . . , 10g). When the header 1 is driven over a field with stalked crop, the stalked crop is guided towards one of the harvesting units via the lane determining elements 8, as will be clear to the skilled person from FIG. 2. Each harvesting unit 10 comprises a channel 12. Thereby, the harvesting units are provided for harvesting the stalked crop by processing the stalked crop in the channel, as will be described hereunder. FIG. 2 further shows the screw conveyor 9 at a back end of the header 1, and wherein the screw conveyor 9 is formed to transport the crop elements from the multiple harvesting units to a central opening (not shown) for transferring the crop elements to the feeder 3 and further to the agricultural vehicle 2.

Figure 3:
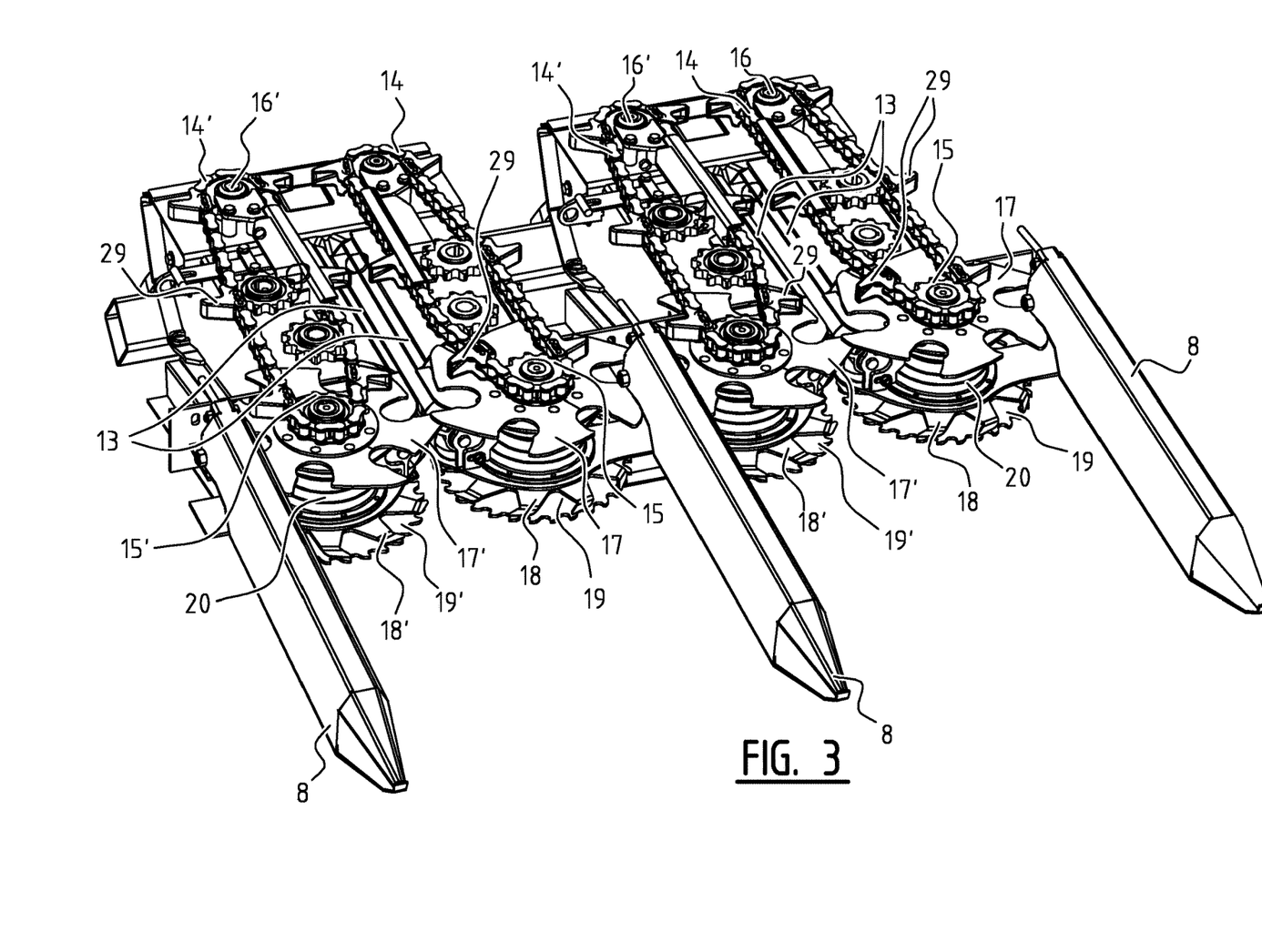
FIG. 3 shows a perspective view of two adjacent harvesting units of the harvesting header of an embodiment of the invention.

FIG. 3 shows two harvesting units in more detail. Thereby, it can be seen in FIG. 3 that the channel 12 of each harvesting unit 10 is defined by a set of deck plates 13. Preferably, two deck plates 13 are provided at a predetermined distance from one another to obtain a channel having a width which is determined by the predetermined distance. The deck plates 13 can have a predefined position, or can be mounted moveable with respect to each other so that the width of the channel between the deck plates can be adapted. In sophisticated harvesting headers, the distance between the deck plates can be automatically adapted based on sensor measurements relating to the harvesting process to thereby optimize the harvesting operation.

Above the deck plates 13, each harvesting unit 10 comprises a pair of gathering chains 14. Thereby, a first gathering chain 14 is provided at a first lateral side of the channel while another gathering chain 14' is provided at a second lateral side of the channel. Furthermore, each gathering chain of the pair of gathering chains extends between a first, front gear 15 and a second, back gear 16. Thereby, front and back are defined in relation to the relative intended movement of the stalked crop elements through the channel, whereby front relates to the position where the stalked crop element arrives first in the channel and wherein back relates to the position where the stalked crop elements are moved towards when moving through the channel. The gathering chain is preferably provided with cams 29 which are defined as lateral protrusions from the chain which are able to at least partially hook behind stalked crop elements moving through the channel, so that the gathering chain is able, via the cams 29, to pull stalked crop elements through the channel from a front end towards a back end of the channel.

To optimize the gathering chain operation, further chain positioning gears can be provided for further defining the position of the gathering chain with respect to the channel defined by the deck plates 13. Two of such additional gears for each gathering chain are shown in FIG. 3. Each gathering chain 14 is driven at a gathering chain speed in such a manner that the cams 29 transport the stalked crop elements through the channel. Thereby, the gathering chain speed can be predetermined or is preferably related to the forward driving speed of the agricultural vehicle carrying the stalked crop harvesting header 1. The gathering chain speed can be further related to the density of stalked crop elements 11 on the field. Further preferably, the gathering chain speed is adapted based on sensor measurements relating to the harvesting process. The gathering chains 14 are preferably actuated at a back of the harvesting unit. In the example of FIG. 3, preferably the second pair of gears 16, 16' are provided with a rotary actuator for driving the gathering chains. An advantage of driving the gathering chains at a back of the harvesting unit, is that there is more space for actuators at the back of the harvesting unit.

Each harvesting unit 10 preferably further comprises a pair of stalk guiding means 17, 18. Thereby the stalk guiding means 17, 18 are adapted to guide all stalks in the harvesting unit lane, which lane is defined by the lane determining elements 8, towards a lateral center of the harvesting unit 10 so that the stalks can be processed in the channel. Consequently, each harvesting unit 10 has a pair of stalk guiding means 17, 18 at either side of the front end of the channel. The stalk guiding means 17, 18 preferably cooperate with cutting means 19 positioned underneath the stalk guiding means 17, 18 so that when stalks are guided to the lateral center of the harvesting unit, the stalks can be cut from the ground surface. As a result of cutting the stalks from the ground surface, moving stalks towards the center is possible without cracking or bending the stalks.

Each one of the pair of stalk guiding means of a harvesting unit preferably comprises a frame 20 adapted to carry stalk guiding elements and crop processing elements of the harvesting units, as will be further described hereunder.

Each one of the pair of stalk guiding means preferably comprises an upper stalk guiding wheel 17 and a lower stalk guiding wheel 18. The upper stalk guiding wheel is preferably mounted at an upper end of the frame 20 while the lower stalk guiding wheel is preferably mounted at a lower end of the frame 20. In this manner, the frame 20 determines the distance between the upper 17 and the lower 18 stalk guiding wheel. Each stalk guiding wheel 17, 18 is preferably disk-shaped wherein the periphery of the disk is provided with multiple indentations. Thereby, each indentation is shaped to catch and hold at least one stalk of the stalked crop 11. The indentations can be formed to be able to enclose multiple stalks at the same time. In this manner, when the stalk guiding wheels rotate, the disks tend to catch and transport the stalks along at least a part of the front end of the disks.

The frame 20 can be shaped, or provided with an element, to push stalks out of the indentations of the stalk guiding wheels when the stalks arrive at an entrance of the channel 12 of the harvesting unit 10. The upper and lower stalk guiding wheels 17, 18 preferably show a distance between each other of at least 5 centimeters, more preferably of at least 8 centimeters, most preferably of at least 10 centimeters. Further preferably, the upper and lower stalk guiding wheels 17, 18 are interconnected via a shaft. As a result of the interconnection via the shaft, the upper stalk guiding wheel and the lower stalk guiding wheel rotate about the same axis and rotate at the same speed. This improves correct guidance of the stalks. The shaft interconnecting the guiding wheels is preferably further connected to the front gear 15 of the gathering chain 14. This has as a direct result that no actuator or motor should be provided at the front end of the harvester for driving the guiding wheels 17, 18. Namely, the gathering chain is driven via the rear gear 16, and this rotation is transferred via the gathering chain 14 to the front gear 15 which can further transmit its rotation via the shaft to the upper and lower guiding wheel 17, 18. Another result of the connection between the gathering chain and the guiding means is that the speed of the gathering chain 14 is directly linked to the rotational speed of the guiding wheels. In practice, this proves to be an advantage since a faster rotation of the guiding wheels, and thereby faster movement of stalks towards the channel, is followed by a faster movement of the stalks through the channel by the gathering chain 14. Thereby, stalk collecting speed, determined by the speed of the guiding wheels, is correlated to the stalk processing speed that is determined by the speed of the gathering chain.

Figure 6:
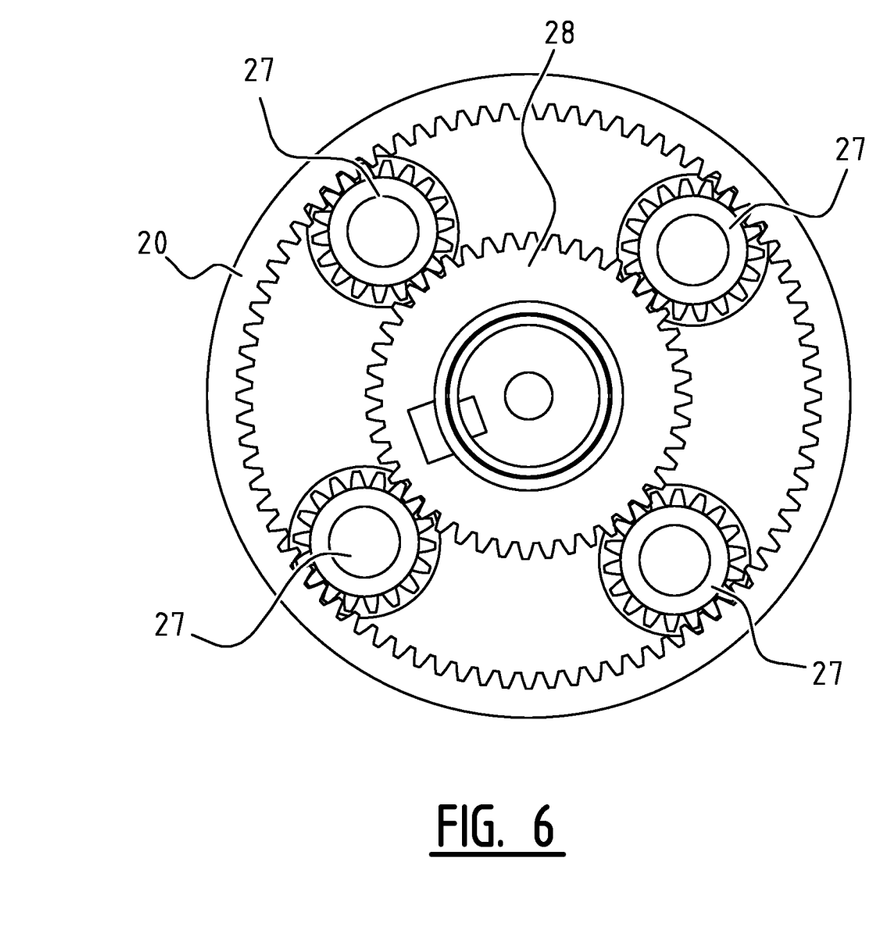
FIG. 6 shows a horizontal cross-section of the frame comprising a planetary gearbox as is usable in a harvesting unit according to an embodiment of the invention.

Preferably, a stalk cutting wheel 19 is provided at a lower end of the frame 20, more preferably below the lower stalk guiding wheel 18. According to a first embodiment, the stalk cutting wheel is formed as a knife which is mounted to the frame in a fixed, stand still, position. Thereby the stalk guiding wheels force the stalks along the knifes so that the stalks are cut. According to a preferred embodiment, the stalk cutting wheel is driven and operates as a blade saw. Thereby, the stalk cutting wheel is preferably disk-shaped, wherein teeth can be provided at the periphery of the disk for improving cutting properties. The cutting wheel preferably rotates around the same axis as the corresponding stalk guiding wheels. However, the cutting wheel preferably rotates significantly faster than the stalk guiding wheels. Such faster rotation can be obtained by providing a separate actuator for the cutting wheel. However, preferably the cutting wheel is connected to the stalk guiding wheels via a gearbox. The gearbox is preferably located inside the frame 20. The gearbox can be formed as a planetary gearbox, as is shown in FIG. 6.

Figure 4:
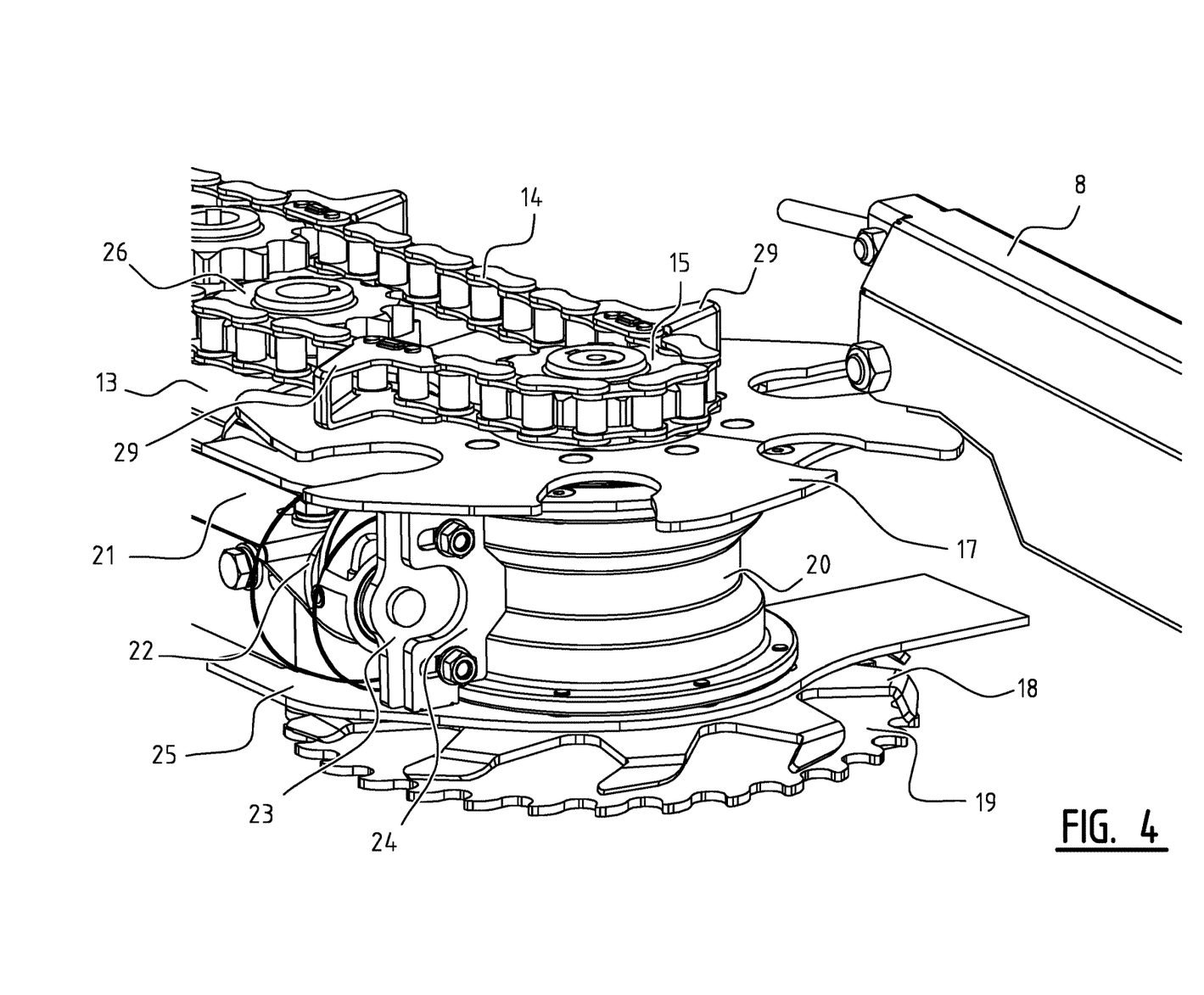
FIG. 4 shows a close-up of a front end of one side of one of the harvesting units of FIG. 3.

The frame 20 is further preferably provided with a protrusion comprising a support for carrying a front end of the snapping rollers, which are described hereunder in relation to FIG. 4. In this manner, the frame 20 is in the preferred embodiment as shown in FIG. 3 multifunctional and carries the front gear 15 of the gathering chain 14, the stalk guiding means 17, 18, defines the distance between the upper guiding wheel 17 and the lower guiding wheel 18, carries the transmission elements interconnecting the guiding wheels and the cutting wheel 19, and forms a support for a front end of the snapping rollers 21.

FIG. 4 shows a perspective view of one side of the channel 12. Thereby, FIG. 4 only shows one element from each of the pairs of elements that form part of the harvesting unit 10. It will be clear that in operation the two elements of the pairs cooperate together to obtain correct operation of the harvesting unit, as will be further shown in FIG. 5. However, construction related issues and choices can be described based on FIG. 4 since this is substantially the same for the two lateral sides of the harvesting unit. Thereby, the skilled person will understand that a plane of symmetry can be defined at a center of the channel 12, and the harvesting unit 10 is built largely symmetrical about the plane of symmetry.

FIG. 4 shows the above described gathering chain 14, guided over a front gear 15. FIG. 4 further shows the upper stalk guiding wheel 17 and the lower stalk guiding wheel 18, and a frame 20 being mounted between the upper and lower stalk guiding wheel. Below the lower stalk guiding wheel 18, the stalk cutting wheel 19 is provided. FIG. 4 further shows one of the two deck plates 13. Below each one of the deck plates 13 (only one deck plate 13 is shown in FIG. 4), a snapping roller 21 is mounted. The pair of snapping rollers is thereby formed and positioned with respect to each other to be able to grasp the stalks in the channel, and to pull these stalks downwards by rotating the snapping rollers. Thereby, stalks are pulled downwards in the channel and consequently pulled downward between the deck plates. The distance between adjacent deck plates 13 is chosen so that the stalks can freely pass through the deck plates while the crop elements are retained by the deck elements 13. This is the result of the crop elements typically being significantly larger in width than the stalks. In this manner, the harvesting unit obtains a separation between stalks and crop elements. Snapping rollers are known in the art and therefore the technical features of these rollers are not described in more detail in this description.

The snapping rollers 21 are preferably provided with a tapered thread at a front end of each snapping roller. The tapered thread is provided to pull stalks, arriving at a front end of the channel, in between the snapping rollers 21. Tests have shown that snapping rollers, because they grasp and pull down the stalks, form a resistance for stalks to enter in between the rollers. Because the harvesting units of the present invention cut the stalks at a lower end, such resistance by the snapping rollers could have as a result that the stalks at least not directly enter the snapping rollers thereby choking the front end of the channel. The tapered thread at a front end of the snapping rollers prevents this by guiding and forcing the stalks in between the snapping rollers 21.

The snapping rollers 21 are rotatebly mounted around respective axis so that each snapping roller rotates around a shaft. This shaft is born at a back end of the snapping rollers and at a front end of the snapping roller. Preferably, the snapping rollers are actuated at a back end of the snapping rollers while the shaft is only held in place at a front end of the snapping roller 21. FIG. 4 illustrates how the front end of the shaft of the snapping roller 21 is supported by the frame 20. In the embodiment of FIG. 4, a supporting element 23 is rigidly mounted to frame 20, particularly to a protrusion 24, which protrusion is specifically provided for mounting the supporting element 23 at the frame 20.

The frame 20 has a predetermined shape which is adapted for performing multiple functions. The frame 20 extends between the upper and the lower stalk guiding wheel 17, 18 to mount these guiding wheels at a predetermined distance from each other. Furthermore, the frame 20 preferably comprises the gear elements connecting the stalk guiding wheels 17, 18 with the stalk cutting wheel 19 so that the stalk cutting wheel 19 can rotate at a significantly higher speed than the guiding wheels. A front end of the frame, whereby front end is considered in relation to the normal moving direction of the harvesting header, extends significantly less to the front than the stalk guiding wheels. As a result, the periphery of the stalk guiding wheels can manipulate the stalks without interference of the frame 20. At an entrance of the channel, the frame 20 is shaped to push stalks out of the guiding wheels 17, 18. Therefore, the frame 20 comprises a stalk pushing element 25 which is shaped to form a funnel for the channel entrance. When a stalk is grasped by the stalk guiding means, and is held in an indentation of the guiding wheels, rotation of the guiding wheels will move the stalk towards the funnel, where the stalk is pushed out of the indentation by the funnel shape. In this manner, stalks are guided to the channel entrance, and are forced into the channel.

FIG. 4 further shows a gathering chain positioning gear 26 which is provided near an entrance of the channel to guide the gathering chain along the channel. This positioning gear 26 thereby allows the first gear 15 to show an offset with respect to the channel, thereby allowing the stalk guiding wheel 17, 18 to be aligned with and driven by the first gear 15, while the gathering chain 14 is close enough to the channel for the protrusions to be able to hook behind the stalks and force the stalks through the channel.

FIG. 4 further shows how the front end of the snapping roller 21 is mounted to the frame 20, considered in the direction of the channel, at the location of the guiding wheel axis. Furthermore, the front end of the snapping roller 21 is mounted within the periphery of the guiding wheels 17, 18. As a result, a front end of the snapping roller 21 extends at least partially, preferably completely between the upper stalk guiding wheel 17 and the lower stalk guiding wheel 18. This proves to be a compact and space efficient manner of mounting the different elements together. A further effect is that the guiding wheels can hold and guide the stalks while the stalks enter in between the snapping rollers 21. As described above, entering in between the snapping rollers 21 can be difficult for a stalk since there is a resistance against entering. By mounting the front end of the snapping rollers between the upper and the lower stalk guiding wheel, stalks are not released in the movement from the stalk guiding wheels to the channel. This results in a highly reliable operation wherein choking of the entrance of the channel is avoided.

Figure 5:
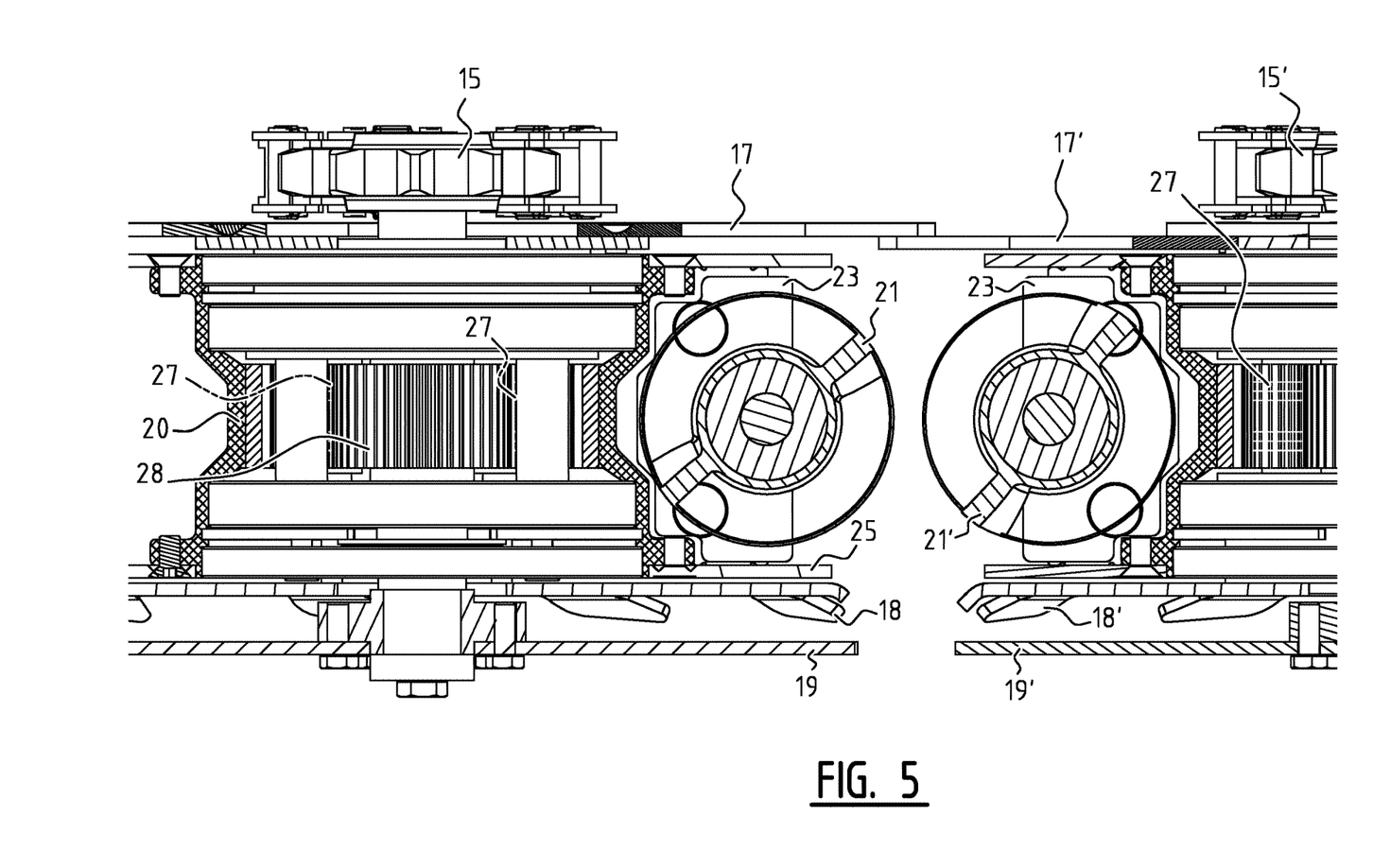
FIG. 5 shows a cross-section of a front end of one of the harvesting units of FIG. 3.

FIG. 5 shows a cross-section of a front end of the harvesting unit. The cross-section is made substantially at the axes of the front gears 15, 15' of the gathering chains of the harvesting unit. The cross-section illustrates how the front gear 15 is connected, via element 27 which will be described hereunder, to the upper stalk guiding wheel 17 and the lower stalk guiding wheel 18. By the interconnection of the lower stalk guiding wheel 18, upper stalk guiding wheel 17 and front gear 15, the latter can rotate simultaneously.

FIG. 5 further shows how the frame 20 comprises a planetary gear system wherein the frame 20 operates as a ring gear while element 27 operates as planetary gear elements and wherein element 28 operates as a sun wheel. Thereby, the planetary gear system can be designed in such a manner that the sun wheel 28 rotates significantly faster than the planetary gear elements 27. The planetary gear elements 27 are connected to the first gear 15 and the upper stalk guiding wheel 17 and the lower stalk guiding wheel 18, while the sun wheel is connected to the stalk cutting wheel 19. Thereby, actuating the gathering chain 14 has as a result that the front gear 15 is rotated, thereby also rotating the stalk guiding means 17, 18, and driving the gear elements 27, 28 so that also the stalk cutting wheel 19 is driven. Thereby, the stalk cutting wheel 19 is driven at a significantly higher rotational speed than the stalk guiding wheels 17, 18.

The FIG. 5 shows that the pair of upper stalk guiding wheels 17, 17' show an overlap in the lateral direction of the harvesting unit. Therefore, in the embodiment of FIG. 5, the left upper stalk guiding wheel 17 is mounted a little higher than the right one of the pair of upper stalk guiding wheels 17'. In this manner, the upper stalk guiding wheels 17 and 17' can have an overlap without colliding.

It will be clear for the skilled person that in the example of FIG. 5 the elements of the harvesting unit 10 shown on the left hand side rotate in a first direction, for example clockwise when looking top down, while the elements on the right hand side of the figure rotate in an opposite direction, for example counterclockwise when considered top down. As a result, both the elements on the left hand side as well as the elements on the right hand side move the stalks towards the channel which is located centrally in the lateral direction. In the present description, corresponding elements on the left and on the right hand side are considered as a pair. Thereby, each harvesting unit has a pair of first gears 15, 15', a pair of upper stalk guiding wheels 17, 17', a pair of lower stalk guiding wheels 18, 18', a pair of stalk cutting wheels 19, 19', a pair of frames 20, 20', etc. These pairs of elements cooperate to guide the stalks towards and through the channel of the harvesting unit.

FIG. 5 also illustrates the pair of snapping rollers 21, 21'. Each roller is mounted via a corresponding mounting element 23, 23' to the corresponding frame 20, 20'. Thereby, the front end of each snapping roller 21 is located at least partially between the upper and the lower stalk guiding wheels 17, 18. The effect of this position of the snapping rollers 21 with respect to the stalk guiding wheels is described above.

FIG. 6 illustrates an example of the planetary gearbox which is suitable to be built into the frame 20. The figure shows the ring wheel 20, formed by the frame, shows the sun wheel 28, which will typically rotate at a high rotational speed compared to the planetary gear elements 27. The skilled person will understand how such planetary gearbox operates, how such planetary gearbox can be designed and how such planetary gearbox can be built into the frame 20 as described above.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. A stalked crop harvesting header comprising:
   a conveyor; and
   at least one harvesting unit comprising:
      at least two deck plates defining a channel;
      at least two snapping rollers mounted below the at least two deck plates and adapted to grasp and pull stalks downwardly through the channel;
      at least two gathering chains adapted for conveying stalks along the channel;
      at least two stalk guiders located on opposite sides of the channel, each located on a respective front end of said channel, each of the at least two stalk guiders comprising:
         a frame comprising a protrusion comprising a support for carrying a front of a respective one of the at least two snapping rollers;
         an upper stalk guiding wheel; and
         a lower stalk guiding wheel carried by the frame,
         wherein the protrusion is located on the frame between the upper and the lower stalk guiding wheels; and
      at least two front gears, each disposed above the upper stalk guiding wheel of a respective one of the at least two stalk guiders, the at least two front gears engaging respective ones of the at least two gathering chains.

2. The stalked crop harvesting header according to claim 1, wherein a front end of each of the at least two snapping rollers is positioned between the upper stalk guiding wheel and the lower stalk guiding wheel of a respective one of the at least two stalk guiders and within a periphery of at least one of the upper stalk guiding wheel and the lower stalk guiding wheel of the respective one of the at least two stalk guiders.

3. The stalked crop harvesting header according to claim 1, wherein each of the at least two stalk guiders further comprises a shaft interconnecting the upper and lower stalk guiding wheels of the each of the at least two stalk guiders.

4. The stalked crop harvesting header according to claim 1, wherein the at least one harvesting unit further comprises at least two stalk cutting wheels axially arranged with the at least two stalk guiders.

5. The stalked crop harvesting header according to claim 4, wherein the at least two stalk cutting wheels are mounted below the lower stalk guiding wheels, respectively, of the at least two stalk guiders.

6. The stalked crop harvesting header according to claim 5, wherein each of the at least two stalk cutting wheels is interconnected via a transmission with the stalk guiding wheels of a respective one of the at least two stalk guiders so that the stalk guiding wheels are provided to be driven at a first rotational speed while the stalk cutting wheels are driven at a second rotational speed which is higher than the first rotational speed.

7. The stalked crop harvesting header according to claim 6, wherein the frame covers the transmission.

8. The stalked crop harvesting header according to claim 6, wherein the transmission is a planetary gearbox.

9. The stalked crop harvesting header according to claim 1, further comprising at least two rear gears, each disposed at a back end of the channel, wherein one of the at least two gathering chains extends between a respective first one of the at least two front gears and a respective first one of the at least two rear gears and another of the at least two gathering chains extends between a respective second one of the at least two front gears and a respective second one of the at least two rear gears, and wherein the at least two front gears are interconnected with the lower stalk guiding wheels, respectively, of the at least two stalk guiders.

10. The stalked crop harvesting header according to claim 9, wherein each of the at least two front gears rotates around a respective shaft, and wherein the shafts are further connected to corresponding ones of the upper and lower stalk guiding wheels so that the upper and lower stalk guiding wheels are interconnected with respective ones of the at least two front gears.

11. The stalked crop harvesting header according to claim 1, wherein the upper and lower stalk guiding wheels of the at least two stalk guiders are disk-shaped and comprise indentations at a periphery thereof.

12. An agricultural harvester carrying a stalked crop harvesting header according to claim 1.

13. A harvesting unit comprising:
at least two deck plates defining a channel;
at least two snapping rollers mounted below the at least two deck plates and adapted to grasp and pull stalks downwardly through the channel;
at least two gathering chains adapted for conveying stalks along the channel;
at least two stalk guiders located on opposite sides of the channel, each located on a respective front end of said channel, each of the at least two stalk guiders comprising:
a frame comprising a protrusion comprising a support for carrying a front of a respective one of the at least two snapping rollers;
an upper stalk guiding wheel; and
a lower stalk guiding wheel carried by the frame, wherein the protrusion is located on the frame between the upper and the lower stalk guiding wheels; and
at least two front gears, each disposed above the upper stalk guiding wheel of a respective one of the at least two stalk guiders, the at least two front gears engaging respective ones of the at least two gathering chains.

14. The harvesting unit of claim 13, wherein a front end of each of the at least two snapping rollers is positioned between the upper stalk guiding wheel and the lower stalk guiding wheel of a respective one of the at least two stalk guiders and within a periphery of at least one of the upper stalk guiding wheel and the lower stalk guiding wheel of the respective one of the at least two stalk guiders.

15. The harvesting unit of claim 13, wherein each of the at least two stalk guiders further comprises a shaft interconnecting the upper and lower stalk guiding wheels of the each of the at least two stalk guiders.

16. The harvesting unit of claim 13, further comprising at least two stalk cutting wheels axially arranged with the at least two stalk guiders.

17. The harvesting unit of claim 16, wherein the at least two stalk cutting wheels are mounted below the lower stalk guiding wheels respectively of the at least two stalk guiders.

18. The harvesting unit of claim 17, wherein each of the at least two stalk cutting wheels is interconnected via a transmission with the stalk guiding wheels of a respective one of the at least two stalk guiders so that the stalk guiding wheels are provided to be driven at a first rotational speed while the stalk cutting wheels are driven at a second rotational speed which is higher than the first rotational speed.

19. The harvesting unit of claim 13, further comprising at least two rear gears, each disposed at a back end of the channel, wherein one of the at least two gathering chains extends between a respective first one of the at least two front gears and a respective first one of the at least two rear gears and another of the at least two gathering chains extends between a respective second one of the at least two front gears and a respective second one of the at least two rear gears, and wherein the at least two front gears are interconnected with the lower stalk guiding wheels, respectively, of the at least two stalk guiders.

20. The harvesting unit of claim 19, wherein each of the at least two front gears rotates around a respective shaft, and wherein the shafts are further connected to corresponding ones of the upper and lower stalk guiding wheels so that the upper and lower stalk guiding wheels are interconnected with respective ones of the at least two front gears.

21. The stalked crop harvesting header according to claim 1, wherein the frame of each of the at least two stalk guiders extends between the upper and lower stalk guiding wheels of the each of the at least two stalk guiders thereby covering the shaft of the each of the at least two stalk guiders.

22. The harvesting unit of claim 13, wherein the frame of each of the at least two stalk guiders extends between the upper and lower stalk guiding wheels of the each of the at least two stalk guiders thereby covering the shaft of the each of the at least two stalk guiders.

* * * * *